(12) United States Patent
Yamawaki et al.

(10) Patent No.: US 12,005,670 B2
(45) Date of Patent: Jun. 11, 2024

(54) RFID TAG MANUFACTURING SYSTEM

(71) Applicant: Murata Manufacturing Co., Ltd., Nagaokakyo (JP)

(72) Inventors: Yoshinori Yamawaki, Nagaokakyo (JP); Noboru Kato, Nagaokakyo (JP); Ryosuke Washida, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 57 days.

(21) Appl. No.: 17/660,112

(22) Filed: Apr. 21, 2022

(65) Prior Publication Data

US 2022/0242081 A1 Aug. 4, 2022

Related U.S. Application Data

(63) Continuation of application No. PCT/JP2021/015412, filed on Apr. 14, 2021.

(30) Foreign Application Priority Data

Apr. 30, 2020 (JP) .................................. 2020-080572

(51) Int. Cl.
*B31D 1/02* (2006.01)
*B31D 1/00* (2017.01)
(Continued)

(52) U.S. Cl.
CPC ........... *B31D 1/028* (2013.01); *B31D 1/0075* (2013.01); *B31D 1/026* (2013.01); *G06K 1/12* (2013.01);
(Continued)

(58) Field of Classification Search
CPC ....................................................... B31D 1/028
(Continued)

(56) References Cited

U.S. PATENT DOCUMENTS

2006/0118229 A1* 6/2006 Ohashi .................. B31D 1/027
29/601
2019/0130239 A1 5/2019 Kimura et al.
2022/0037778 A1* 2/2022 Tanaka .................. H10K 10/88

FOREIGN PATENT DOCUMENTS

JP H04102800 U 9/1992
JP 2004054483 A 2/2004
(Continued)

OTHER PUBLICATIONS

International Search Report issued for PCT/JP2021/015412, dated Jun. 8, 2021.

*Primary Examiner* — Rafferty D Kelly
(74) *Attorney, Agent, or Firm* — ArentFox Schiff LLP

(57) ABSTRACT

An RFID tag manufacturing system is provided that includes a conveyance device that conveys a base sheet provided with a plurality of antenna patterns to each of which an RFIC module is fixed. The system includes a laminating device that attaches a cover seal on the base sheet to cover the antenna patterns and a punching device that produces RFID tags by punching the cover seal and the base sheet with a punching blade that includes a frame-shaped cutting edge surrounding the antenna patterns to form a frame-shaped cut. The base sheet includes alignment mark in a non-attachment part of the cover seal. The punching device specifies the position of each of the antenna patterns covered with the cover seal based on the alignment mark, and punches the cover seal and the base sheet based on the specified position of the antenna pattern.

20 Claims, 17 Drawing Sheets

(51) Int. Cl.
*G06K 1/12* (2006.01)
*G06K 19/077* (2006.01)

(52) U.S. Cl.
CPC .... *G06K 19/07718* (2013.01); *B31D 2201/02* (2013.01)

(58) Field of Classification Search
USPC .......................................................... 235/488
See application file for complete search history.

(56) References Cited

FOREIGN PATENT DOCUMENTS

| | | | |
|---|---|---|---|
| JP | 2005340773 | A | 12/2005 |
| JP | 2010030062 | A | 2/2010 |
| JP | 4975392 | B2 | 7/2012 |
| WO | 2018012427 | A1 | 1/2018 |

\* cited by examiner

RFID TAG MANUFACTURING SYSTEM

CROSS REFERENCE TO RELATED APPLICATIONS

This application is a continuation of PCT Application No. PCT/JP2021/015412, filed Apr. 14, 2021, which claims priority to Japanese Patent Application No. 2020-080572, filed Apr. 30, 2020, the entire contents of each of which are hereby incorporated in their entirety.

TECHNICAL FIELD

The present invention relates to an RFID tag manufacturing system.

BACKGROUND

A sheet-like RFID tag is conventionally known. For example, WO 2018/012427 A (hereinafter "Patent Document 1") discloses a sheet-like RFID tag that is attached to an article when used.

In recent years, there is an increasing need for a sheet-like RFID tag. Therefore, a manufacturing system is desired for mass-producing RFID tags.

SUMMARY OF THE INVENTION

Therefore, it is an object of the present invention to provide a manufacturing system that mass produces sheet-like RFID tags.

Thus, according to one exemplary aspect, an RFID tag manufacturing system is provided that includes a conveyance device that conveys a base sheet provided with a plurality of antenna patterns to each of which an RFIC module is fixed; a first laminating device that attaches a cover seal on the base sheet to cover the antenna patterns; and a punching device that produces a plurality of RFID tags each including one of the antenna patterns by punching the cover seal and the base sheet with a punching blade to form a frame-shaped cut. In this aspect, the punching blade includes a frame-shaped cutting edge surrounding the antenna patterns, in which the cover seal is smaller in size than the base sheet that includes an alignment mark in a non-attachment part of the cover seal. Moreover, the punching device specifies a position of each of the antenna patterns covered with the cover seal based on the alignment mark, and punches the cover seal and the base sheet based on the specified position of the antenna pattern.

According to the present invention, a sheet-like RFID tag can be mass-produced.

DETAILED DESCRIPTION

Figure 1:
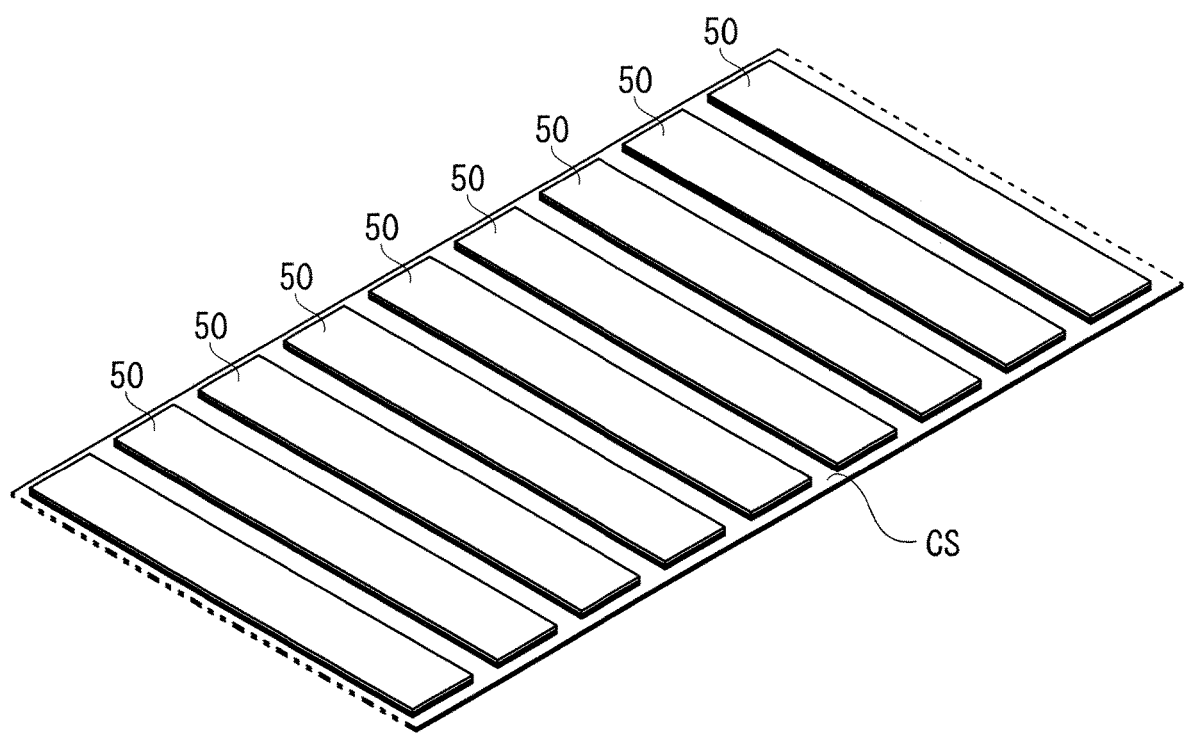
FIG. 1 is a perspective view of an RFID tag in one example manufactured by an RFID tag manufacturing system according to an exemplary embodiment.

An RFID tag manufacturing system according to one exemplary aspect includes a conveyance device that conveys a base sheet provided with a plurality of antenna patterns to each of which an RFIC module is fixed; a first laminating device that attaches a cover seal on the base sheet to cover the antenna patterns; and a punching device that produces a plurality of RFID tags each including one of the antenna patterns by punching the cover seal and the base sheet with a punching blade to form a frame-shaped cut. Moreover, the punching blade includes a frame-shaped cutting edge surrounding the antenna patterns, in which the cover seal is smaller in size than the base sheet, the base sheet includes an alignment mark in a non-attachment part of the cover seal, and the punching device specifies a position of each of the antenna patterns covered with the cover seal based on the alignment mark and punches the cover seal and the base sheet based on the specified position of the antenna pattern.

According to this exemplary aspect, a sheet-like RFID tag can be mass-produced.

In another exemplary aspect, the alignment mark can be a mark used when a mounting device is positioned and mounted to the RFIC module with respect to the antenna pattern.

In another exemplary aspect, when each of the base sheet and the cover seal has a long-side direction and a short-side direction, the conveyance device can convey the base sheet in the long-side direction, and the first laminating device can attach the cover seal to the base sheet being conveyed by the conveyance device such that the long-side direction of the base sheet and the long-side direction of the cover seal become parallel to each other. This design enables the manufacture of the RFID tag by a roll to roll method.

In another exemplary aspect, the punching device can include a magnet roller, an anvil roller that is disposed to oppose the magnet roller and forms a nip region through which a base sheet passes between the magnet roller and the anvil roller, and a flexible die that is wound around an outer periphery of the magnet roller and includes the punching blade on an outer surface. This configuration enables the punching of a base sheet BS while conveying.

In another exemplary aspect, the flexible die can include, on an inner surface thereof, a plurality of grooves extending in an extending direction of a rotation center line of the magnet roller and parallel to one another. This causes the flexible die to easily curve, and the adhesion of the flexible die to the magnet roller to be improved.

In another exemplary aspect, a through hole having an opening larger than that of an RFIC module can be formed at a position opposing the RFIC module on the base sheet on the outer surface of the flexible die. This configuration reduces the force applied from the magnet roller to the RFIC module via the flexible die, and suppresses damage to the RFIC module.

In another exemplary aspect, the RFID tag manufacturing system can further include a second laminating device that attaches a carrier sheet with a pressure-sensitive adhesion layer to an entire surface of the base sheet on an opposite side to a surface provided with the antenna pattern, and the punching device can punch the pressure-sensitive adhesion layer without punching the carrier sheet. This configuration makes it possible to bring a plurality of RFID tags into one.

In another exemplary aspect, a recovery reel that peels off, from the carrier sheet, and recovers an outer part of the RFID tag in the base sheet, the cover seal, and the pressure-sensitive adhesion layer after being punched by the punching device can be provided. This makes it easier to separate the RFID tag from the carrier sheet.

An exemplary embodiment of the present invention will be described below with reference to the drawings.

Figure 2:
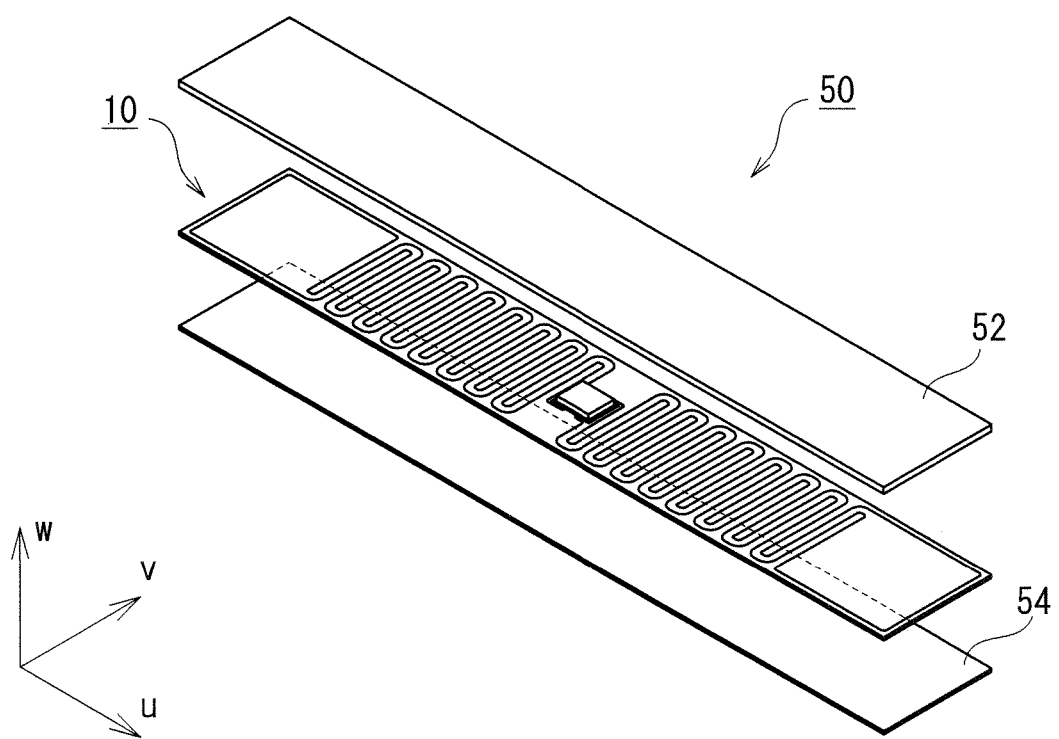
FIG. 2 is an exploded perspective view of the RFID tag.

FIG. 1 is a perspective view of an RFID tag in one example manufactured by an RFID tag manufacturing system according to an exemplary embodiment. FIG. 2 is an exploded perspective view of the RFID tag. A u-v-w coordinate system in the drawing is for facilitating understanding of the invention and does not limit the invention. For purposes of this disclosure, a u-axis direction indicates a long-side direction of a wireless communication device, a v-axis direction indicates a width direction, and a w-axis direction indicates a thickness direction.

As illustrated in FIG. 1, a radio-frequency identification (RFID) tag manufacturing system according to the present embodiment is configured to manufacture a plurality of RFID tags 50 peelably attached to a carrier sheet CS.

As illustrated in FIG. 2, each RFID tag 50 includes a wireless communication device 10, which is a main body part thereof, a label seal 52 that covers and protects an antenna pattern and the like on the wireless communication device 10, and an adhesion layer 54 for causing the RFID tag 50 to adhere to an article to which the carrier sheet CS and the RFID tag 50 thereof are attached.

Figure 3:
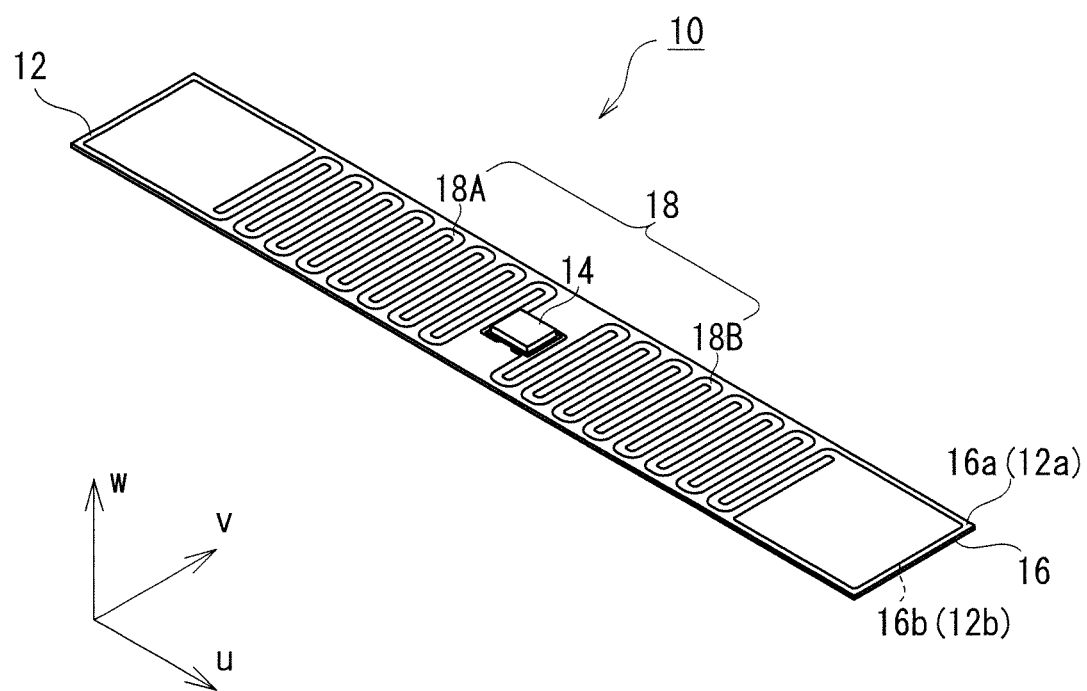
FIG. 3 is a perspective view of a wireless communication device in the RFID tag.
Figure 4:
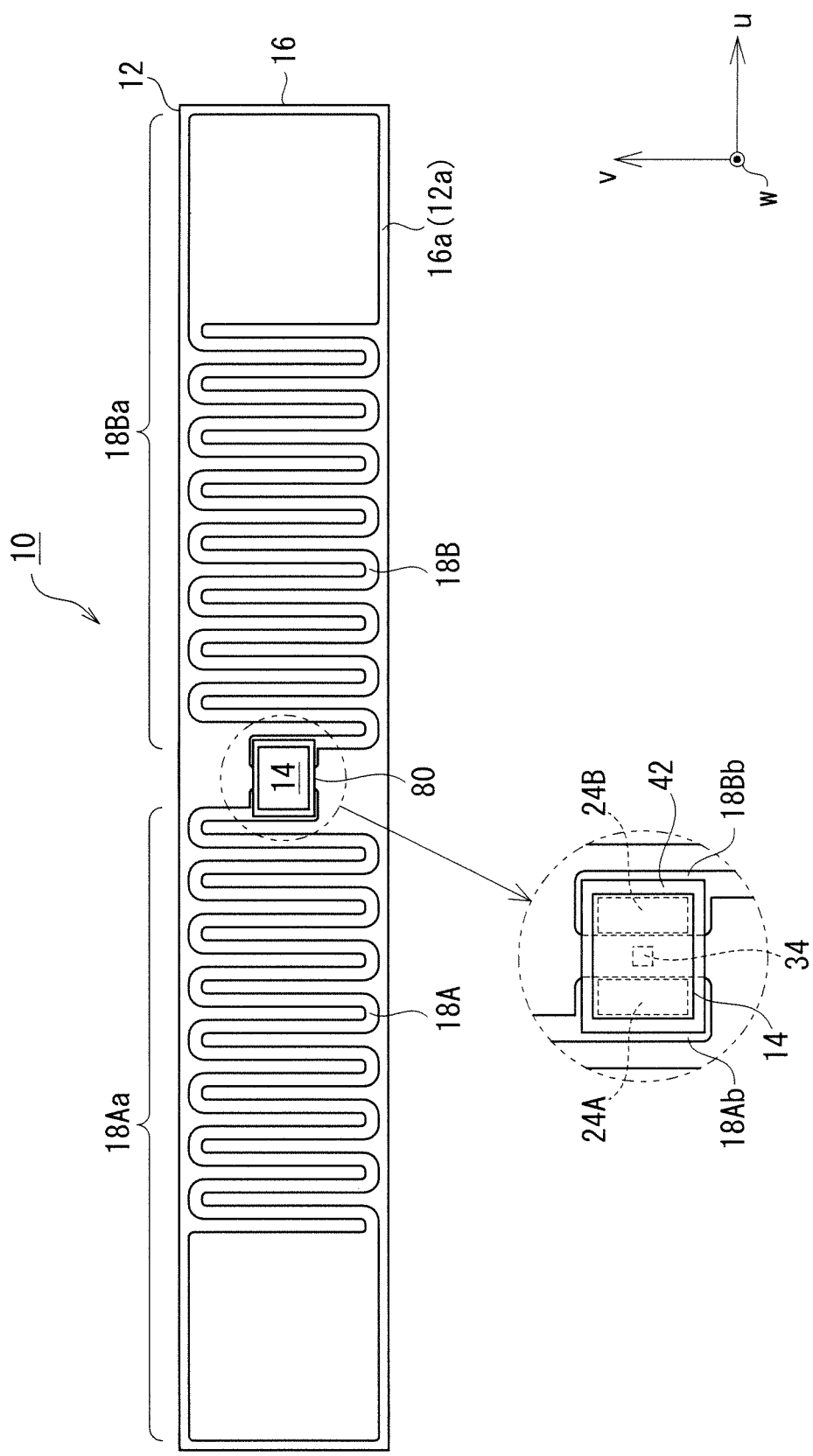
FIG. 4 is a top view of the wireless communication device.

FIG. 3 is a perspective view of the wireless communication device in the RFID tag, and FIG. 4 is a top view of the wireless communication device.

As illustrated in FIGS. 3 and 4, the wireless communication device 10 has a strip shape and is used as a component of the RFID tag 50.

Specifically, as illustrated in FIGS. 3 and 4, the wireless communication device 10 has an antenna member 12 and a radio-frequency integrated circuit (RFIC) module 14 provided in the antenna member 12.

As shown, the antenna member 12 of the wireless communication device 10 has a strip shape (e.g., an elongated rectangular shape) and includes an antenna substrate 16 and an antenna pattern 18 provided on one surface 16a (e.g., a first main surface 12a of the antenna member 12) of the antenna substrate 16.

In an exemplary aspect, the antenna substrate 16 is a flexible sheet-shaped member produced from an insulating material such as a polyimide resin. As illustrated in FIGS. 3 and 4, the antenna substrate 16 also includes surfaces 16a and 16b that function as the first main surface 12a and a second main surface 12b of the antenna member 12. Since the antenna substrate 16, which is a main component of the antenna member 12, has flexibility, the antenna member 12 can also have flexibility.

The antenna pattern 18 is used as an antenna for the wireless communication device 10 to wirelessly communicate with an external communication device (e.g., a reader/writer device when the wireless communication device 10 is used as an RFID tag). In the case of the present embodiment, antenna patterns 18A and 18B are conductor patterns produced from metal foil such as silver, copper, or aluminum.

As shown in the present embodiment, the antenna pattern 18 includes first and second antenna patterns 18A and 18B. The first and second antenna patterns 18A and 18B include radiating parts 18Aa and 18Ba, respectively, for transmitting and receiving radio waves, and coupling parts 18Ab and 18Bb (first and second coupling parts), respectively, for electrically connecting with the RFIC module 14.

Moreover, the radiating parts 18Aa and 18Ba of the first and second antenna patterns 18A and 18B are dipole antennas and have a meander shape. The radiation parts 18Aa and 18Ba extend from the coupling parts 18Ab and 18Bb, respectively, provided at the central part in the long-side direction (u-axis direction) of the antenna substrate 16 toward both ends of the antenna substrate 16.

The coupling parts 18Ab and 18Bb of the first and second antenna patterns 18A and 18B are electrically connected to a terminal electrode of the RFIC module 14 described in detail later. Each of the coupling parts 18Ab and 18Bb is a rectangular land.

Figure 5:
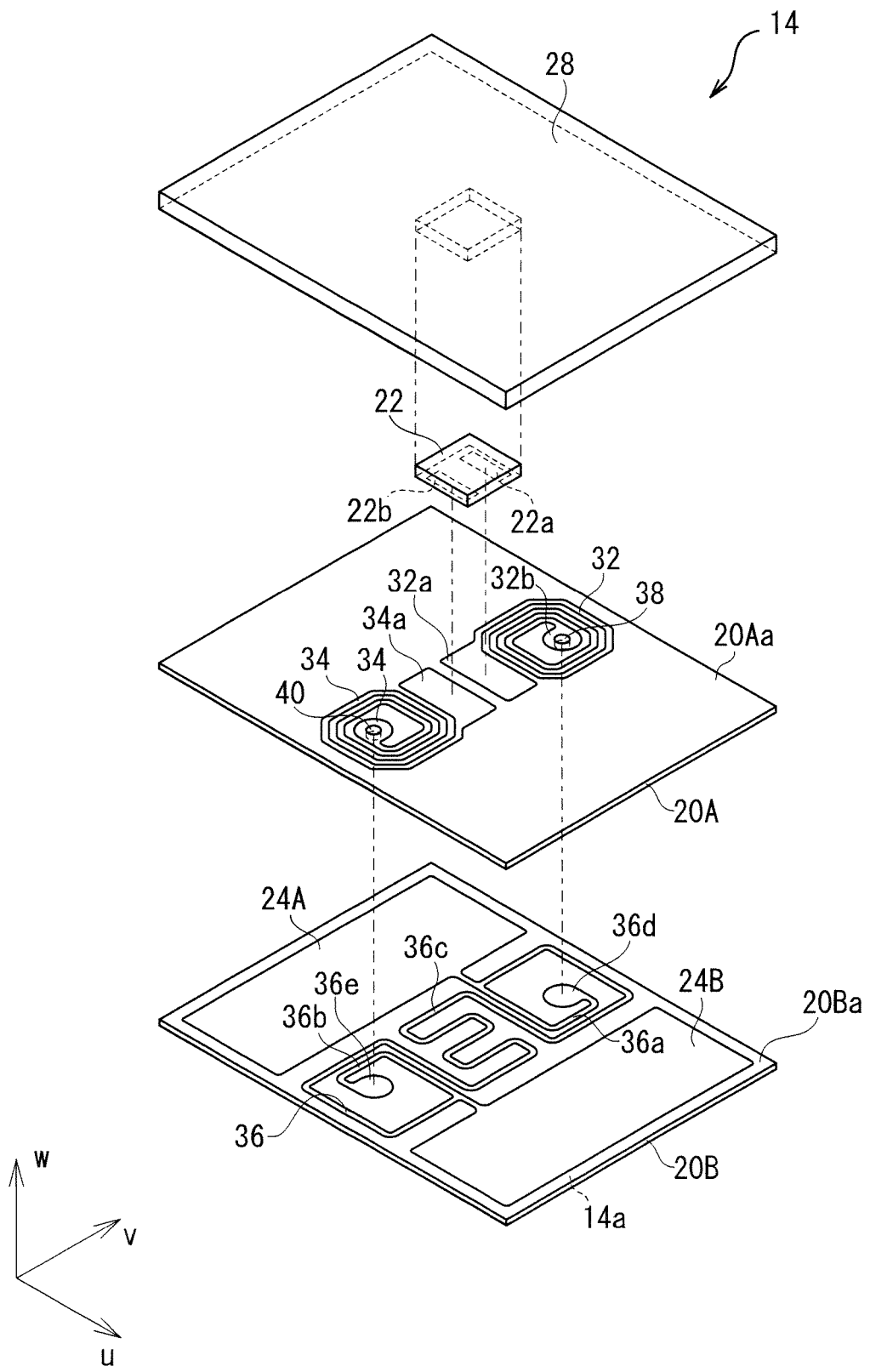
FIG. 5 is an exploded perspective view of an RFIC module.
Figure 6:
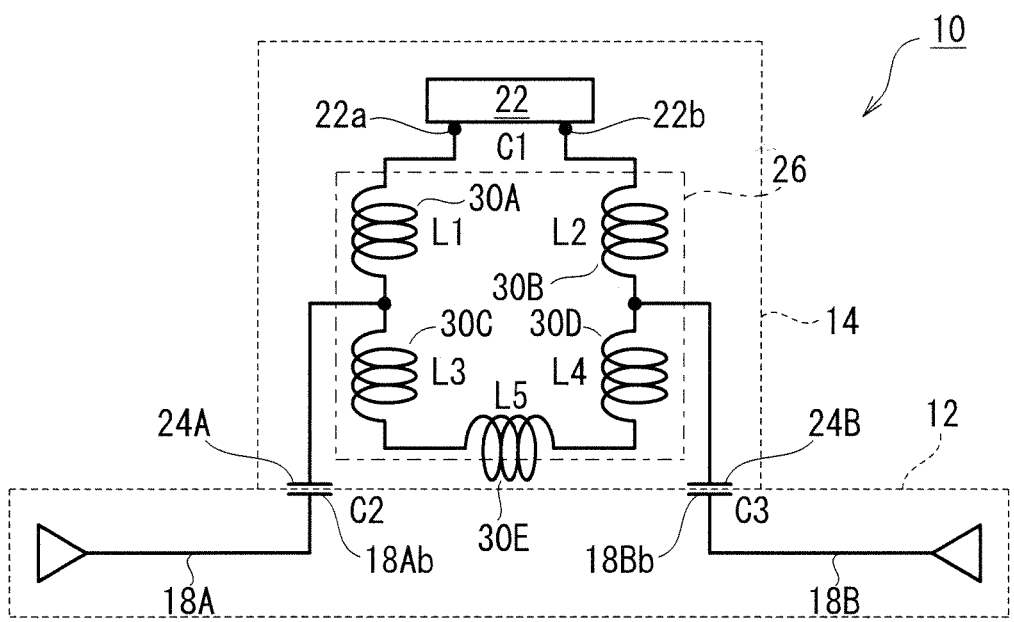
FIG. 6 is an equivalent circuit diagram of the wireless communication device.

FIG. 5 is an exploded perspective view of the RFIC module. FIG. 6 is an equivalent circuit diagram of the wireless communication device.

As illustrated in FIGS. 5 and 6, the RFIC module 14 is a device that performs wireless communication via the first and second antenna patterns 18A and 18B at a communication frequency in, for example, the 900 MHz band, i.e., the UHF band.

As illustrated in FIG. 5, in the present embodiment, the RFIC module 14 is a multilayer structure. Specifically, as a module base material that is a main element, the RFIC module 14 includes two thin plate-shaped insulating sheets 20A and 20B produced from an insulating material and laminated. Each of the insulating sheets 20A and 20B is a flexible sheet produced from an insulating material such as polyimide or liquid crystal polymer.

As illustrated in FIGS. 5 and 6, the RFIC module 14 includes an RFIC chip 22 and terminal electrodes 24A and 24B (e.g., first and second terminal electrodes) connected to the RFIC chip 22. Moreover, the RFIC module 14 includes a matching circuit 26 provided between the RFIC chip 22 and the terminal electrodes 24A and 24B. A laminate including the insulating sheets 20A and 20B, which are module base materials, is larger in planar dimension than the RFIC chip 22. More specifically, in a plan view of the main surface of the module base material provided with the RFIC chip 22, the external dimension of the module base material is larger than the external dimension of the RFIC chip 22 (dimension relationship that can include the RFIC chip 22 in the outline of the module base material).

The RFIC chip 22 is a chip that drives at a frequency (e.g., a communication frequency) in the UHF band, and has a structure in which various elements are incorporated in a semiconductor substrate made of a semiconductor such as silicon. The RFIC chip 22 includes a first input/output terminal 22a and a second input/output terminal 22b. As illustrated in FIG. 6, the RFIC chip 22 includes an internal capacitance (capacitance: self-capacitance of the RFIC chip itself) C1. Here, the areas of the terminal electrodes 24A and 24B are larger than the areas of the first input/output terminal 22a and the second input/output terminal 22b. This improves productivity of the wireless communication device 10. This is because aligning the RFIC module 14 with the antenna patterns 18A and 18B is easier than aligning the first and second input/output terminals 22a and 22b of the RFIC chip 22 directly on the coupling parts 18Ab and 18Bb of the first and second antenna patterns 18A and 18B.

As illustrated in FIG. 5, the RFIC chip 22 is incorporated in the RFIC module 14, which is a multilayer structure. Specifically, the RFIC chip 22 is disposed on the insulating sheet 20A and sealed in a resin package 28 formed on the insulating sheet 20A. The resin package 28 is produced from, for example, an elastomer resin such as polyurethane or a hot melt resin. This resin package 28 protects the RFIC chip 22. This resin package 28 improves the flexural rigidity of the RFIC module 14 having a multilayer structure including the flexible insulating sheets 20A and 20B (compared with the rigidity of the insulating sheet alone). As a result, the RFIC module 14 incorporating the RFIC chip 22 can be handled by a component supply device such as a parts feeder as described later, similarly to electronic components (for reference, the RFIC chip 22 alone cannot be handled by a parts feeder or the like because of potential damage such as chipping).

Moreover, in the exemplary aspect, the terminal electrodes 24A and 24B are conductor patterns produced from a conductor material such as silver, copper, or aluminum, and are provided on an inner surface 20Ba of the insulating sheet 20B constituting a first main surface 14a of the RFIC module 14 (surface on an opposite side to the first main surface 14a and opposing the insulating sheet 20A). That is, in the case of the present embodiment, the terminal electrodes 24A and 24B are incorporated without being exposed to the outside of the RFIC module 14. The terminal electrodes 24A and 24B have a rectangular shape. Although described later, these terminal electrodes 24A and 24B are electrodes for electrically connecting to the coupling parts 18Ab and 18Bb of the first and second antenna patterns 18A and 18B via a pressure-sensitive adhesion layer 42.

As illustrated in FIG. 6, the matching circuit 26 provided between the RFIC chip 22 and the terminal electrodes 24A and 24B includes a plurality of inductance elements 30A to 30E.

Each of the plurality of inductance elements 30A to 30E is configured by a conductor pattern provided on each of the insulating sheets 20A and 20B.

An outer surface 20Aa (e.g., a surface provided with the resin package 28) of the insulating sheet 20A of the RFIC module 14 is provided with conductor patterns 32 and 34 produced from a conductor material such as silver, copper, or aluminum. Each of the conductor patterns 32 and 34 is a spiral coil-shaped pattern, and includes land parts 32a and 34a for electrically connecting with the RFIC chip 22 at the outer peripheral side end. The land part 32a and the first input/output terminal 22a of the RFIC chip 22 are electrically connected via, for example, solder or a conductive adhesive. Similarly, the land portion 34a and the second input/output terminal 22b are also electrically connected.

As illustrated in FIG. 6, one spiral coil-shaped conductor pattern 32 on the insulating sheet 20A forms an inductance element 30A having an inductance L1. The other spiral coil-shaped conductor pattern 34 forms an inductance element 30B having an inductance L2.

A conductor pattern 36 produced from a conductor material such as silver, copper, or aluminum is provided on the insulating sheet 20B adjacent to the insulating sheet 20A. The conductor pattern 36 includes the terminal electrodes 24A and 24B, spiral coil parts 36a and 36b, and a meander part 36c. In the insulating sheet 20B, the spiral coil parts 36a and 36b and the meander part 36c are disposed between the terminal electrodes 24A and 24B.

As further shown, one spiral coil part 36a of the conductor pattern 36 on the insulating sheet 20B is electrically connected to the terminal electrode 24A. A center side end 36d of the spiral coil part 36a is electrically connected to a center side end 32b of the spiral coil-shaped conductor pattern 32 on the insulating sheet 20A via an interlayer connection conductor 38, such as a through hole conductor formed on the insulating sheet 20A. The spiral coil part 36a is configured such that a current flowing through the conductor pattern 32 and a current flowing through the spiral coil part 36a circulate in the same direction. As illustrated in FIG. 6, the spiral coil part 36a forms an inductance element 30C having an inductance L3.

The other spiral coil part 36b of the conductor pattern 36 on the insulating sheet 20B is electrically connected to the terminal electrode 24B. A center side end 36e of the spiral coil part 36b is electrically connected to a center side end 34b of the spiral coil-shaped conductor pattern 34 on the insulating sheet 20A via an interlayer connection conductor 40 such as a through hole conductor formed on the insulating sheet 20A. The spiral coil part 36b is configured such that a current flowing through the conductor pattern 34 and a current flowing through the spiral coil part 36b circulate in the same direction. As illustrated in FIG. 6, the spiral coil part 36b forms an inductance element 30D having an inductance L4.

The meander part 36c of the conductor pattern 36 on the insulating sheet 20B electrically connects the outer peripheral side end of the one spiral coil part 36a and the outer peripheral side end of the other spiral coil part 36b. As illustrated in FIG. 6, the meander part 36c forms an inductance element 30E having an inductance L5.

The matching circuit 26 including the inductance elements 30A to 30E (including the self-capacitance C1 of the RFIC chip 22) matches the impedance between the RFIC chip 22 and the terminal electrodes 24A and 24B at a predetermined frequency (e.g., a communication frequency). The inductance elements 30A to 30E and the RFIC chip 22 make a closed loop circuit, and the terminal electrodes 24A and 24B are connected through the inductance element 30E. Therefore, the impedance becomes low in a low frequency range (e.g., a frequency band of DC to 400 MHz). As a result, as will be described later, even if a high potential difference due to static electricity is generated between the first and second antenna patterns 18A and 18B when the base sheet BS is roll-conveyed at a high speed, the terminal electrodes 24A and 24B are suppressed to a low voltage, and the RFIC chip 22 is not destroyed by static electricity. It is possible to protect the RFIC chip 22 without performing special processing, such as antistatic processing or antistatic blow on the base sheet BS.

According to such the wireless communication device 10, when the first and second antenna patterns 18A and 18B receive a radio wave (e.g., a signal) of a predetermined frequency (e.g., a communication frequency) in the UHF band, a current corresponding to the signal flows from the first and second antenna patterns 18A and 18B to the RFIC chip 22. Upon receiving supply of the current, the RFIC chip 22 is driven, and outputs a current (e.g., a signal) corresponding to information stored in a storage unit (not illustrated) inside the RFIC chip to the first and second antenna patterns 18A and 18B. Then, a radio wave (e.g., a signal) corresponding to the current is radiated from the first and second antenna patterns 18A and 18B.

The configuration of the RFID tag 50, in particular, the wireless communication device 10, which is the main body of the RFID tag 50, has been described so far. Hereinafter, a method for manufacturing such the wireless communication device 10 will be described.

Figure 7:
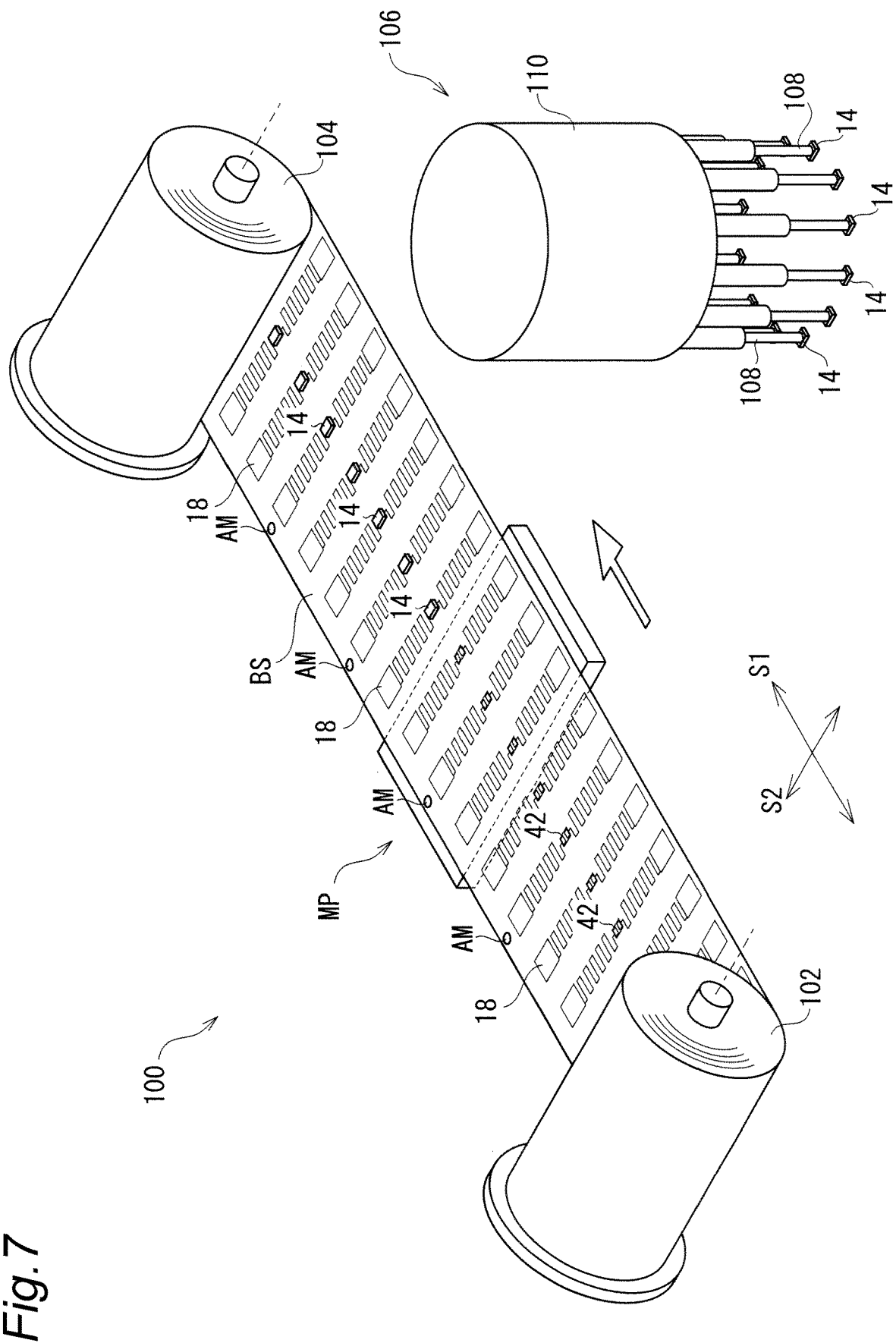
FIG. 7 is a schematic configuration diagram of a wireless communication device manufacturing system of one example.

FIG. 7 is a schematic configuration diagram of the wireless communication device manufacturing system of one example.

As illustrated in FIG. 7, in a wireless communication device manufacturing system 100 of one example, the wireless communication device 10 is manufactured by fixing the RFIC module 14 to each of the plurality of antenna patterns 18 (e.g., the first and second antenna patterns 18A and 18B) formed on the base sheet BS. The base sheet BS is a material of the antenna substrate 16, and includes a long-side direction S1 and a short-side direction S2. The plurality of antenna patterns 18 are provided on a base sheet S in a state of being arranged side by side in the long-side direction S1. It is noted that in the case of the present embodiment, the antenna patterns 18 are arranged side by side in the long-side direction S1 in a single column, but may be provided in a plurality of columns such as a double column according to an alternative aspect.

In the wireless communication device manufacturing system 100 of the exemplary aspect, in order to fix the RFIC module 14 to the base sheet BS, the base sheet BS is provided with the pressure-sensitive adhesion layer 42 in advance at a position where the RFIC module 14 is fixed. The pressure-sensitive adhesion layer 42 is a layer of an insulating pressure-sensitive adhesive, and is provided in advance on the base sheet BS by, for example, screen printing. Specifically, as illustrated in FIG. 4, the pressure-sensitive adhesion layer 42 is provided on the base sheet BS so as to cover both the coupling part 18Ab of the first antenna pattern 18A and the coupling part 18Bb of the second antenna pattern 18B.

By fixing the RFIC module 14 on such the pressure-sensitive adhesion layer 42, the coupling part 18Ab of the first antenna pattern 18A and the terminal electrode 24A oppose each other with the pressure-sensitive adhesion layer 42 interposed therebetween. At the same time, the coupling part 18Bb of the second antenna pattern 18B and the terminal electrode 24B oppose each other with the pressure-sensitive adhesion layer 42 interposed therebetween. As a result, as illustrated in FIG. 6, the coupling part 18Ab and the terminal electrode 24A are electrically connected via a capacitance C2, and the coupling part 18Bb and the terminal electrode 24B are electrically connected via a capacitance C3. Moreover, in the exemplary aspect, no air layer is interposed between the pressure-sensitive adhesion layer 42 and the RFIC module 14. This prevents, after the label seal 52 is attached to the mounting surface of the RFIC module 14 of the wireless communication device 10, the air layer under the RFIC module 14 from expanding due to a temperature change or the like in an actual use environment, the RFIC module 14 from being pushed up, the coupling capacitance with the first and second antenna patterns 18A and 18B from changing, and electrical characteristic deterioration from being given.

As illustrated in FIG. 7, the base sheet BS is a roll sheet. That is, the base sheet BS includes the long-side direction S1 and the short-side direction S2, and is provided to the wireless communication device manufacturing system 100 of one example in a state of being wound around a supply reel 102. The base sheet BS is conveyed from the supply reel 102 in the long-side direction S1 thereof, and after the RFIC module 14 is fixed, the base sheet BS is wound around a recovery reel 104 and recovered. Although not illustrated, the wireless communication device manufacturing system 100 includes a guide roller, a feed roller, and the like as a means for conveying the base sheet BS from the supply reel 102 toward the recovery reel 104.

In wireless communication device manufacturing system 100, the RFIC module 14 is placed on the pressure-sensitive adhesion layer 42 on the base sheet BS at a mounting position MP on a conveyance route of the base sheet BS between the supply reel 102 and the recovery reel 104. To that end, the wireless communication device manufacturing system 100 has a mounting device 106 that mounts the RFIC module 14 on the pressure-sensitive adhesion layer 42. The mounting device 106 mounts the RFIC module 14 on the pressure-sensitive adhesion layer 42 via a mounting head 110 that can be equipped with a plurality of nozzles 108 configured for sucking the RFIC module 14 and move them in a horizontal direction and a vertical direction.

In order to position the RFIC module 14 in a state of being sucked by the nozzle 108 with respect to the pressure-sensitive adhesion layer 42, the base sheet BS includes an alignment mark AM. Moreover, the mounting device 106 includes a camera (not illustrated) that captures an image of a part of the base sheet BS positioned at the mounting position MP, for example, in the mounting head 110. The position of the alignment mark AM is specified based on the captured image of the camera, and the positions of the coupling parts 18Ab and 18Bb of the first and second antenna patterns 18A and 18B are specified based on the specified position of the alignment mark AM, i.e., the position of the pressure-sensitive adhesion layer 42 is specified. Based on the specified position of the pressure-sensitive adhesion layer 42, the RFIC module 14 is positioned with respect to the pressure-sensitive adhesion layer 42.

As further shown, the base sheet BS on which the RFIC module 14 is mounted by the mounting device 106 is wound around the recovery reel 104. As a result, the RFIC module 14 is pressed against the pressure-sensitive adhesion layer 42, thereby fixing the RFIC module 14 to the pressure-sensitive adhesion layer 42.

The base sheet BS to which the RFIC module 14 is fixed and wound around the recovery reel 104 is conveyed to the RFID tag manufacturing system according to the present embodiment together with the recovery reel 104.

Figure 8:
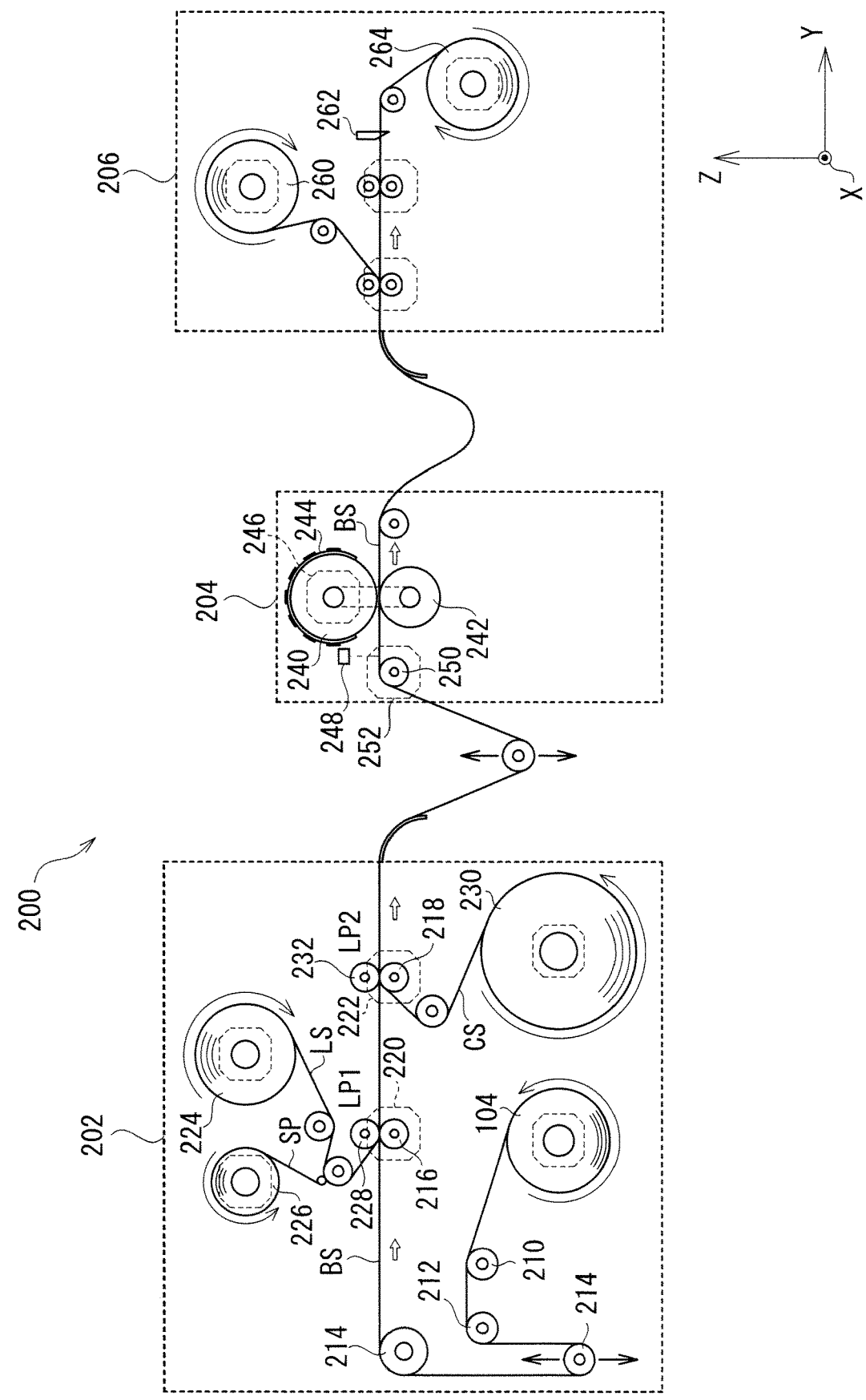
FIG. 8 is a schematic configuration diagram of an RFID tag manufacturing system according to an exemplary embodiment.

FIG. 8 is a schematic configuration diagram of the RFID tag manufacturing system according to the present embodiment.

As illustrated in FIG. 8, a RFID tag manufacturing system 200 is configured to perform various processing on the base sheet BS while conveying the base sheet BS in the long-side direction S1 thereof. An open arrow in the figure indicates the conveyance direction of the base sheet BS.

As illustrated in FIG. 8, the RFID tag manufacturing system 200 includes a laminating device 202 that attaches a label seal LS to the base sheet BS to which the RFIC module 14 is fixed, and a punching device 204 that punches the base sheet BS to which the label seal LS is attached and manufactures the RFID tag 50. In the present embodiment, the RFID tag manufacturing system 200 also has a finishing device 206 that cuts an excess part of the carrier sheet CS and peels off, from the carrier sheet CS, an excess part (e.g., the outer portion of the RFID tag 50) of the base sheet BS punched out by the punching device 204.

As illustrated in FIG. 8, the laminating device 202 is configured to be attachable with the recovery reel 104 that winds the base sheet BS around which the RFIC module 14 is fixed by the wireless communication device manufacturing system 100 illustrated in FIG. 7. The laminating device 202 includes a conveying device that conveys the base sheet BS in the long-side direction S1 thereof so that the base sheet BS moves from the recovery reel 104 toward the punching device 204 through lamination positions LP1 and LP2.

The conveyance device of the laminating device 202 is a part of the conveyance device of the RFID tag manufacturing system 200, and includes a plurality of rollers 210 to 218. In an exemplary aspect, the roller 214 is a dancing roller that applies tension to the base sheet BS, and the rollers 216 and 218 are conveying rollers that convey the base sheet BS. The conveying rollers 216 and 218 are rotationally driven by motors 220 and 222.

In the present embodiment, the laminating device 202 performs laminating processing on the base sheet BS at the first lamination position LP1 and the second lamination position LP2.

Figure 9:
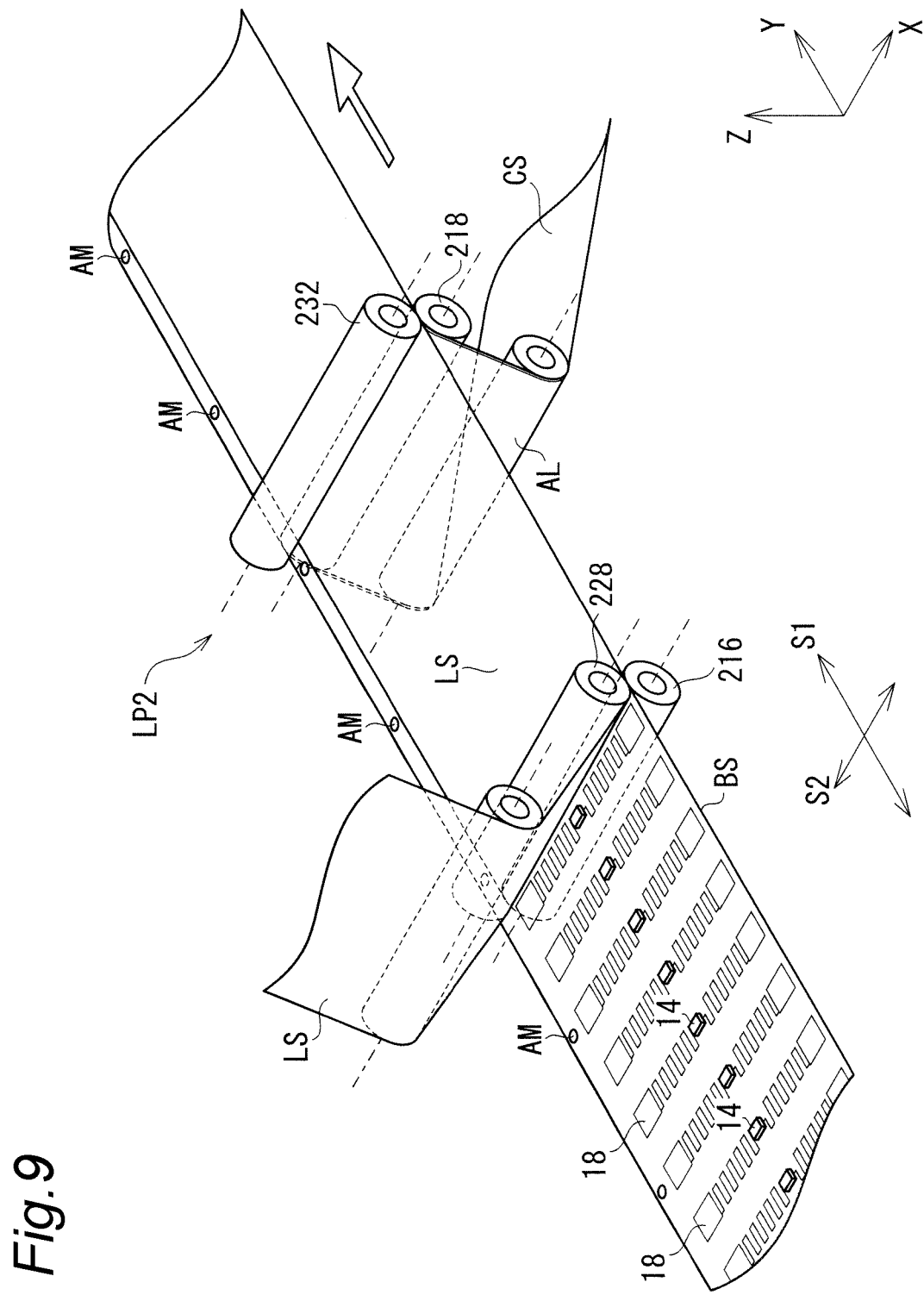
FIG. 9 is a perspective view of a base sheet subjected to laminating processing.

FIG. 9 is a perspective view illustrating the base sheet subjected to the laminating processing.

As illustrated in FIG. 9, the laminating device 202 is configured to attach the label seal LS to the base sheet BS being conveyed at the first lamination position LP1.

Similarly to the base sheet BS, the label seal LS includes the long-side direction S1 and the short-side direction S2. The label seal LS is a material of the label seal 52 illustrated in FIG. 2.

The label seal LS (i.e., the label seal 52) is configured to function as a cover seal that covers and protects the antenna pattern 18 and the RFIC module 14 fixed to the antenna pattern 18. In the present embodiment, the label seal LS can also function as a print label on which information on an article to which the RFID tag 50 is attached is printed. The label seal LS is produced from a printable material, for example, a paper material.

As illustrated in FIG. 8, the label seal LS is wound around a label seal supply reel 224. The label seal LS is provided with an adhesion layer for causing the label seal LS to adhere to the base sheet BS. The adhesion layer is protected by a seal backing sheet SP, and the seal backing sheet SP is peeled off from the label seal LS before the label seal LS reaches the first lamination position LP1. The peeled seal backing sheet SP is wound around a seal backing sheet recovery reel 226 and recovered.

The label seal LS from which the seal backing sheet SP has been peeled off is conveyed in the long-side direction S1 between the conveying roller 216 and a nip roller 228 disposed at the first lamination position LP1. The base sheet BS passes in the long-side direction S1 thereof between the conveying roller 216 and the nip roller 228. As a result, the base sheet BS and the label seal LS are sandwiched by the conveying roller 216 and the nip roller 228, and the label seal LS is attached to the base sheet BS such that the long-side directions S1 of the base sheet BS and the label seal LS become parallel to each other.

As illustrated in FIG. 9, the label seal LS is attached to the base sheet BS so as to cover the antenna pattern 18 and the RFIC module 14. However, since the label seal LS is smaller in size (e.g., in size in the short-side direction S2) than the base sheet BS, a non-attachment part where the label seal LS is not attached is generated on the base sheet BS. The non-attachment part is provided with the alignment mark AM in the exemplary aspect.

To explain the reason, when the label seal LS is attached to the base sheet BS as illustrated in FIG. 9, the antenna pattern 18 and the RFIC module 14 become invisible as a result. That is, the position of the antenna pattern 18 on the base sheet BS becomes unspecifiable in view of the label seal LS. In order to specify the position of the antenna pattern 18, the label seal LS is attached to the base sheet BS so as not to cover (e.g., hide) the alignment mark AM. That is, by specifying the position of the alignment mark AM, it is possible to indirectly specify the position of the antenna pattern 18 covered with the label seal LS.

In the present embodiment, as illustrated in FIG. 9, the laminating device 202 is configured to attach the carrier sheet CS to the base sheet BS being conveyed at the second lamination position LP2.

Similarly to the base sheet BS, the carrier sheet CS includes the long-side direction S1 and the short-side direction S2. The carrier sheet CS includes a pressure-sensitive adhesion layer AL on one surface thereof. The pressure-sensitive adhesion layer AL is a material of the adhesion layer 54 illustrated in FIG. 2.

As illustrated in FIG. 1, the carrier sheet CS is a sheet that peelably holds the plurality of RFID tags 50, whereby the plurality of RFID tags 50 can be handled collectively. The carrier sheet CS is produced from a material having flexibility, for example, a resin material.

As illustrated in FIG. 8, the carrier sheet CS is wound around a carrier sheet supply reel 230.

The carrier sheet CS is conveyed in the long-side direction S1 thereof between the conveying roller 218 and a nip roller 232 disposed at the second lamination position LP2. The base sheet BS to which the label seal LS is attached passes in the long-side direction S1 thereof between the conveying roller 218 and the nip roller 232. As a result, the base sheet BS and the carrier sheet CS are sandwiched between the conveying roller 218 and the nip roller 232, and the carrier sheet CS is attached to the base sheet BS with the pressure-sensitive adhesion layer AL interposed therebetween such that the long-side directions S1 of the base sheet BS and the carrier sheet CS become parallel to each other. As shown, the carrier sheet CS is attached to the entire surface of the base sheet BS on the opposite side to the surface to which the label seal LS is attached.

The base sheet BS on which the label seal LS and the carrier sheet CS are attached is then conveyed from the laminating device 202 to the punching device 204.

As illustrated in FIG. 8, the punching device 204 is disposed on a downstream side (e.g., to the right in the Y-axis direction) of the conveyance direction of the base sheet BS with respect to the laminating device 202. In the case of the present embodiment, the punching device 204 is configured to convey the base sheet BS while punching the label seal LS, the base sheet BS, and the pressure-sensitive adhesion layer AL, thereby continuously producing the RFID tag 50 illustrated in FIG. 2.

Figure 10:
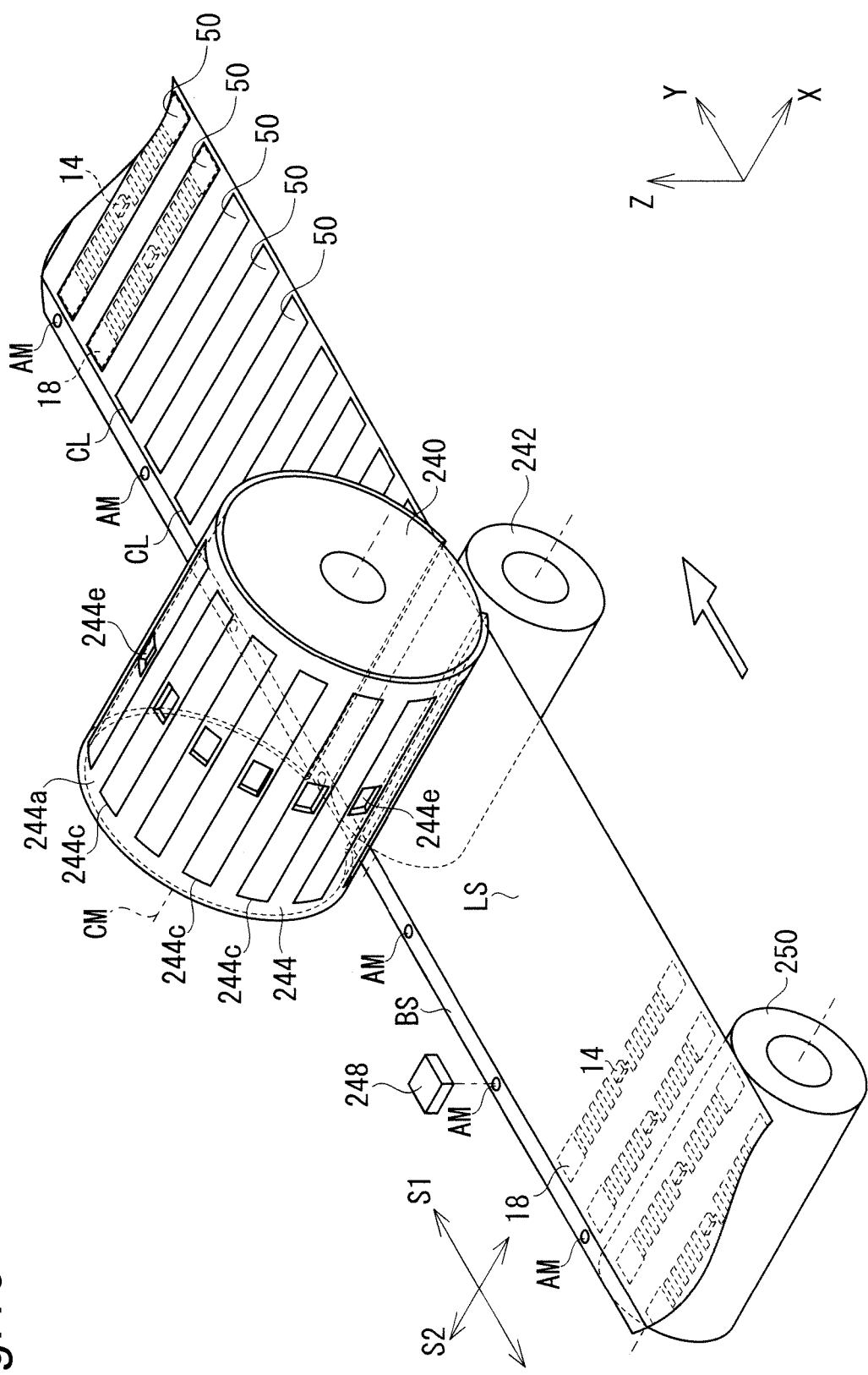
FIG. 10 is a perspective view of a base sheet subjected to a punching processing.
Figure 11:
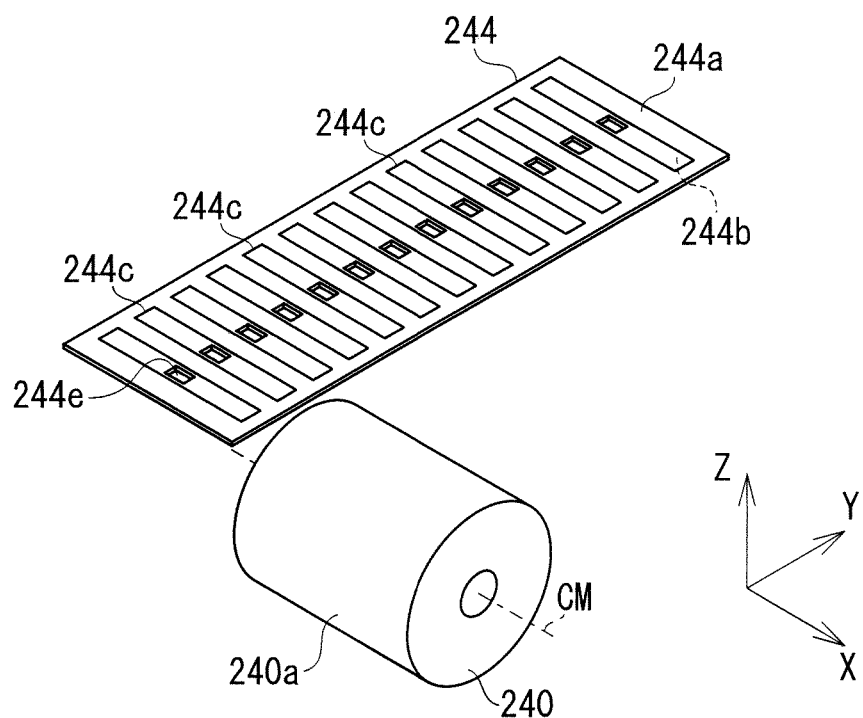
FIG. 11 is a perspective view of a flexible die before being wound around a magnet roller.

FIG. 10 is a perspective view of the base sheet subjected to the punching processing. FIG. 11 is a perspective view of the flexible die before being wound around the magnet roller. Furthermore, it is a view illustrating the inner surface of the flexible die.

As illustrated in FIGS. 8 and 10, in the present embodiment, the punching device 204 includes a magnet roller 240, an anvil roller 242, and a flexible die 244 wound around the outer periphery of the magnet roller 240.

As illustrated in FIGS. 10 and 11, the magnet roller 240 is a roller that holds, by magnetic force, the metal flexible die 244 wound around an outer periphery 240a, and is disposed so as to oppose the label seal LS attached to the base sheet BS. Moreover, the magnet roller 240 is rotationally driven by a motor 246.

The anvil roller 242 is a roller that supports the base sheet BS that is subjected to the punching processing, and is disposed so as to oppose the magnet roller 240. Due to this configuration, a nip region through which the base sheet BS passes is formed between the magnet roller 240 and the anvil roller 242. The anvil roller 242 rotates in a direction opposite to and in synchronization with the rotation of the magnet roller 240 so that the peripheral speed in the nip region becomes the same as the peripheral speed of the magnet roller 240. Therefore, the anvil roller 242 is driven and coupled to the magnet roller 240.

Figure 12:
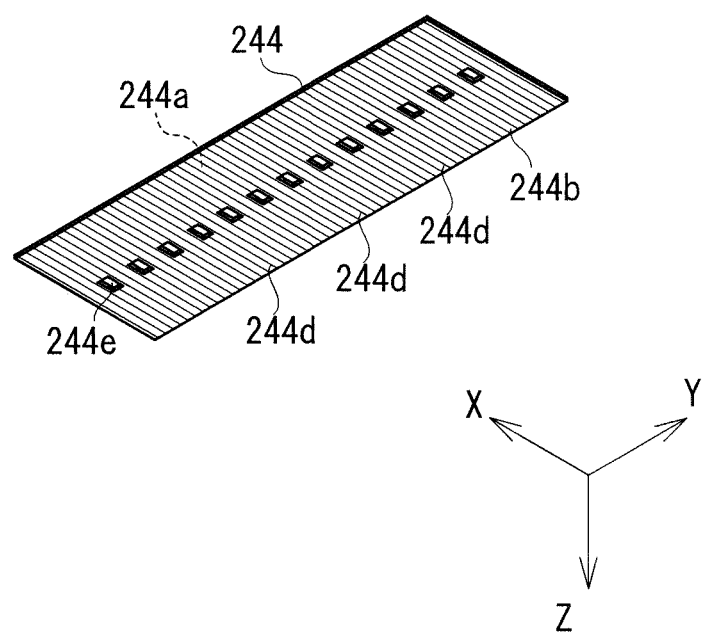
FIG. 12 is a perspective view illustrating an inner surface of the flexible die.

As illustrated in FIGS. 11 and 12, the flexible die 244 is a thin plate-like member and is produced from a metal material. The flexible die 244 includes an outer surface 244a and an inner surface 244b that is in close contact with the outer periphery 240a of the magnet roller 240 by magnetic force. The outer surface 244a of the flexible die 244 is provided with a plurality of punching blades 244c that protrude from the outer surface 244a and punch the base sheet BS.

Figure 13:
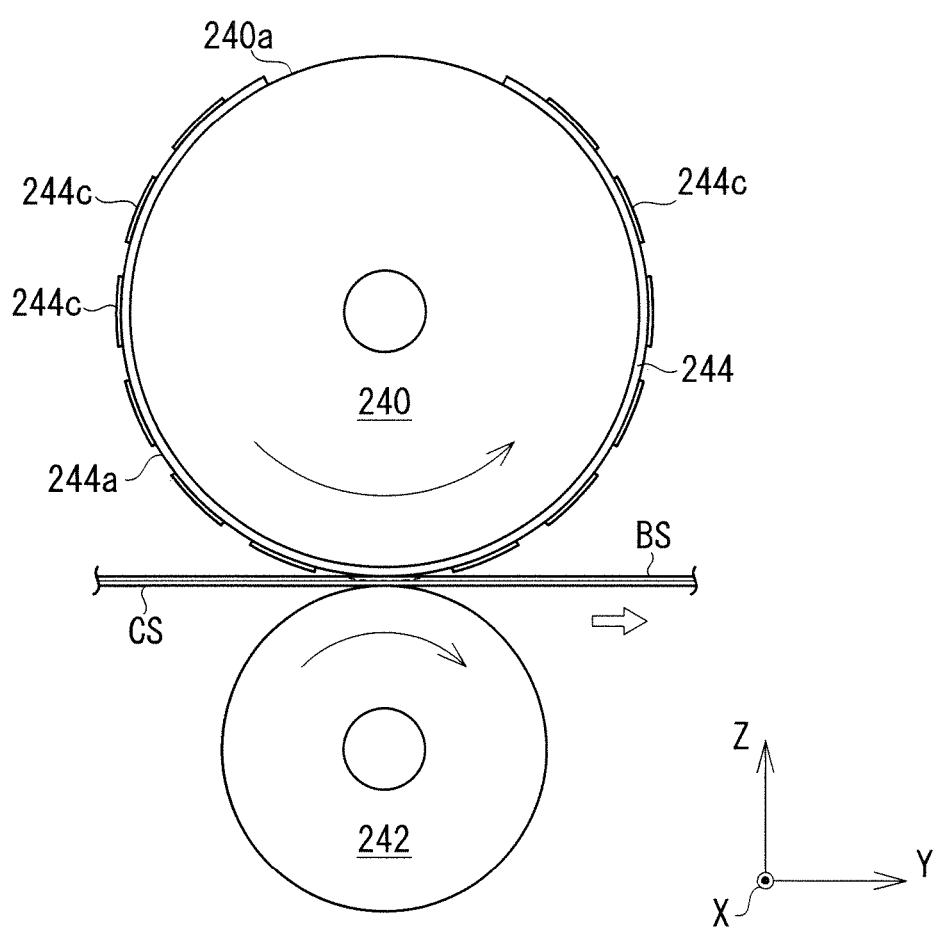
FIG. 13 is a side view of a base sheet subjected to the punching processing by a punching blade of the flexible die.
Figure 14:
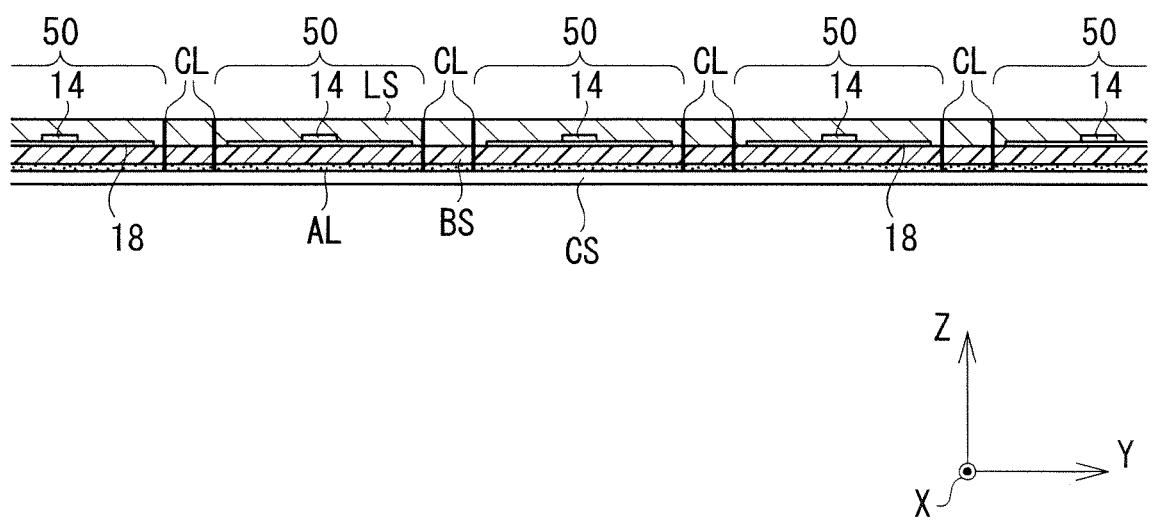
FIG. 14 is a view illustrating a base sheet in which an RFID tag is produced by the punching processing.

FIG. 13 is a side view of the base sheet subjected to the punching processing by the punching blade of the flexible die. FIG. 14 is a view illustrating the base sheet in which the RFID tag is produced by the punching processing.

As illustrated in FIG. 11, the punching blade 244c of the flexible die 244 includes a frame-shaped cutting edge. By the punching with such the punching blade 244c, a frame-shaped cut CL surrounding the antenna pattern 18 is formed as illustrated in FIGS. 10 and 14. The punching blade 244c punches the label seal LS, the base sheet BS, and the pressure-sensitive adhesion layer AL. However, the punching blade 244c does not punch the carrier sheet CS. That is, the punching blade 244c protrudes from the outer surface 244a at a height substantially equal to the total thickness of the label seal LS, the base sheet BS, and the pressure-sensitive adhesion layer AL. By such operation of the punching blade 244c, the RFID tag 50 that is configured by each portion of the label seal LS, the base sheet BS, and the pressure-sensitive adhesion layer AL surrounded by the frame-shaped cut CL, i.e., illustrated in FIG. 2 is manufactured.

Moreover, in the present embodiment, the flexible die 244 includes a plurality of grooves 244d parallel to one another on the inner surface 244b. The plurality of grooves 244d are, for example, etching grooves, and extend in the extending direction of a rotation center line CM of the magnet roller 240. The plurality of grooves 244d make it easy to curve the flexible die 244, and can be brought into close contact with the outer periphery 240a of the magnet roller 240.

In the present embodiment, as illustrated in FIGS. 10 and 11, the outer surface 244a of the flexible die 244 is provided with a through hole 244e having an opening larger than the RFIC module 14 at a position opposing the RFIC module 14 on the base sheet S. This relaxes the force applied from the magnet roller 240 to the RFIC module 14 via the flexible die 244. This makes it possible to suppress damage to the RFIC module 14, in particular the RFIC chip 22 incorporated in the RFIC module 14.

As illustrated in FIGS. 10 and 14, in order for the cut CL formed by the punching blade 244c to accurately surround the antenna pattern 18, it is necessary to position the punching blade 244c and the antenna pattern 18 with respect to each other. That is, it is necessary to match the timing at which each of the punching blade 244c and the antenna pattern 18 on the base sheet BS reach the nip region between the magnet roller 240 and the anvil roller 242. Otherwise, the punching blade 244c possibly cuts the antenna pattern 18 and the RFIC module 14.

The alignment mark AM on the base sheet BS is used to position the punching blade 244c of the flexible die 244 and the antenna pattern 18 with each other, i.e., to specify the position of the antenna pattern 18.

For this purpose, the punching device 204 includes a sensor 248 that detects the alignment mark AM on the base sheet BS, and a positioning roller 250 that positions the base sheet BS based on the detection result of the alignment mark AM of the sensor 248.

Figure 15A:
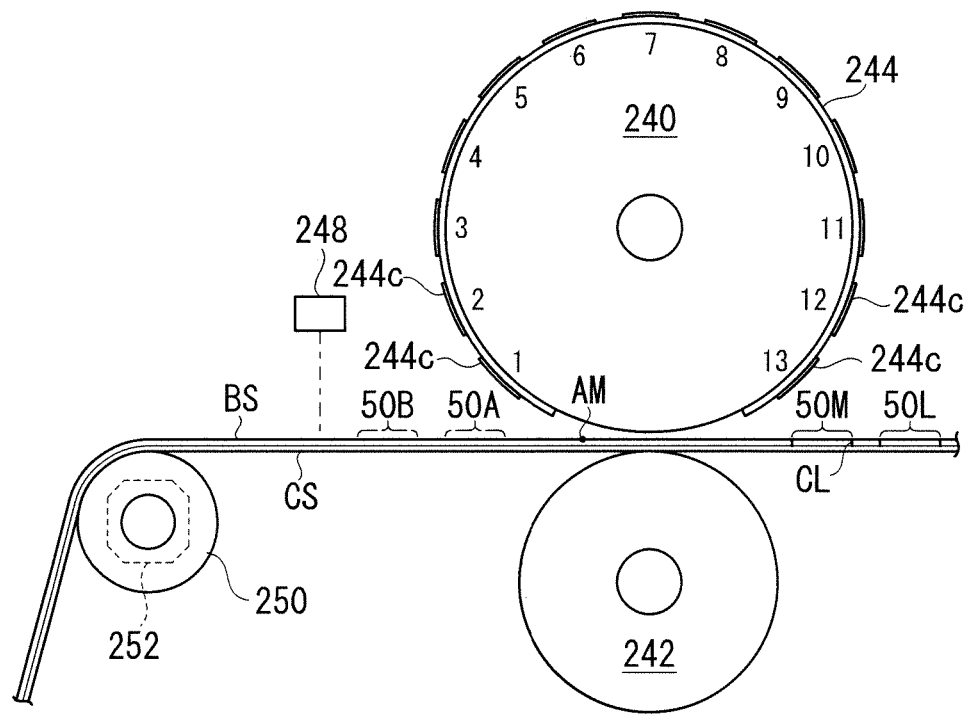
FIG. 15A is a view illustrating a punching device when the magnet roller is at a reference angular position.
Figure 15B:
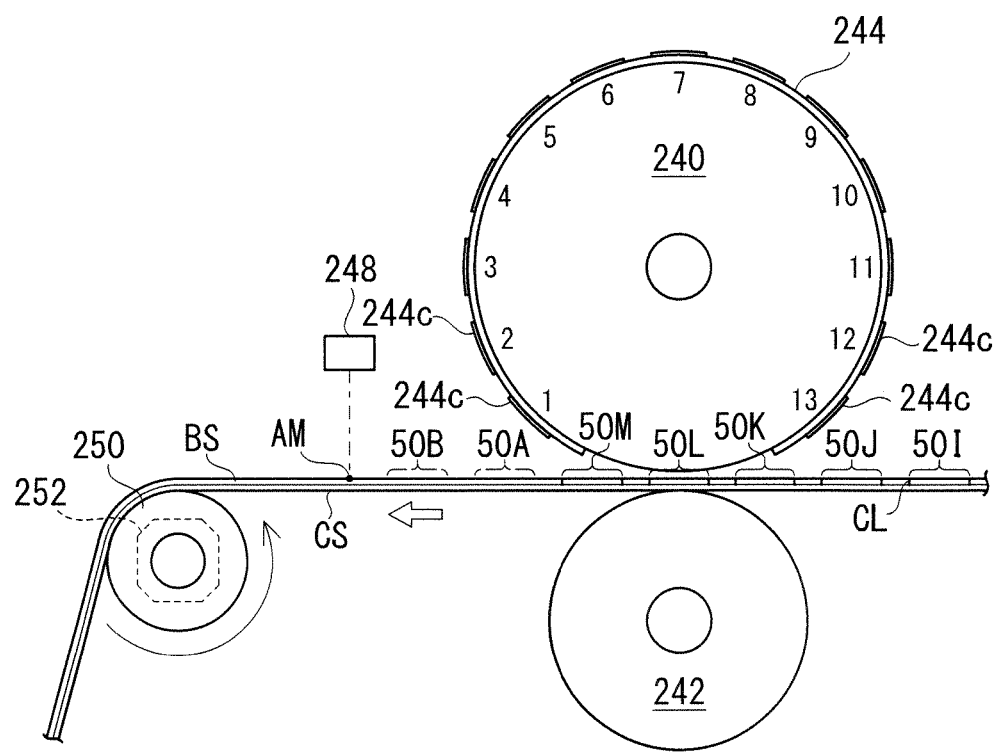
FIG. 15B is a view illustrating the punching device when the base sheet is in a positioned state.

FIG. 15A is a view illustrating the punching device when the magnet roller is at a reference angular position. FIG. 15B is a view illustrating the punching device when the base sheet is in a positioned state.

As illustrated in FIG. 15A, when the magnet roller 240 is at the reference angular position, the plurality of punching blades 244c of the flexible die 244 are separated from the base sheet BS, and the base sheet BS is in a state of being freely movable in the long-side direction thereof.

When the magnet roller 240 rotates from the state illustrated in FIG. 15A, the first punching blade 244c punches the base sheet BS, thereby newly producing an RFID tag 50A. However, in this case, it is not possible to produce an RFID tag between an RFID tag 50M already created by punching with the thirteenth punching blade 244c and the newly produced RFID tag 50A. That is, some of the antenna patterns 18 on the base sheet BS and the RFIC module 14 are not used for producing the RFID tag 50.

Therefore, as illustrated in FIG. 15A, the RFID tag 50M is produced by punching with the thirteenth punching blade 244c, and when the magnet roller 240 reaches the reference angular position, the rotation of the magnet roller 240 is stopped. Next, the positioning roller 250 retracts the base sheet BS as illustrated in FIG. 15B. Specifically, the base sheet BS is retracted so that the first punching blade 244c can produce the RFID tag 50A following the RFID tag 50M produced by the thirteenth punching blade 244c. The positioning roller 250 is rotationally driven by a motor 252.

However, as described above, since the antenna pattern 18 is covered with the label seal LS, the position of the antenna pattern 18 cannot be specified. Therefore, the alignment mark AM is used to specify the position of the antenna pattern 18.

As illustrated in FIG. 15B, when the sensor 248 normally detects the alignment mark AM (i.e., specifies the position of the alignment mark AM), the positioning roller 250 is stopped, and the positioning of the base sheet BS is completed. Due to this operation, the position of the antenna pattern 18 following the antenna pattern 18 of the RFID tag 50M is specified, and the specified antenna pattern 18 is positioned with respect to the first punching blade 244c. This allows the first punching blade 244c to form the cut CL in the base sheet BS so as to surround the specified antenna pattern 18.

When the positioning of the base sheet BS is completed as illustrated in FIG. 15B, the magnet roller 240 resumes the rotation, and the first punching blade 244c produces the RFID tag 50A following the RFID tag 50M. Then, the magnet roller 240 conveys the base sheet BS via the punching blade 244c that pierces the base sheet BS.

Such positioning processing is executed every time the magnet roller 240 makes one rotation. As a result, the punching blade 244c of the flexible die 244 can continuously punch the base sheet BS so that the cut CL surrounds the antenna pattern 18.

When the positioning process is executed, conveyance of the base sheet BS is temporarily interrupted. That is, production of the RFID tag 50 is temporarily interrupted. The outer diameter of the magnet roller 240 may be made larger than the outer diameter of the anvil roller 242 in order to increase the number of RFID tags 50 that can be produced between timings of executing the positioning processing.

In operation, the base sheet BS punched by the punching device 204, i.e., the base sheet BS on which the RFID tag 50 is produced, is conveyed to the finishing device 206.

As illustrated in FIG. 8, the finishing device 206 is disposed on a downstream side of the conveyance direction of the base sheet BS with respect to the punching device 204.

Figure 16:
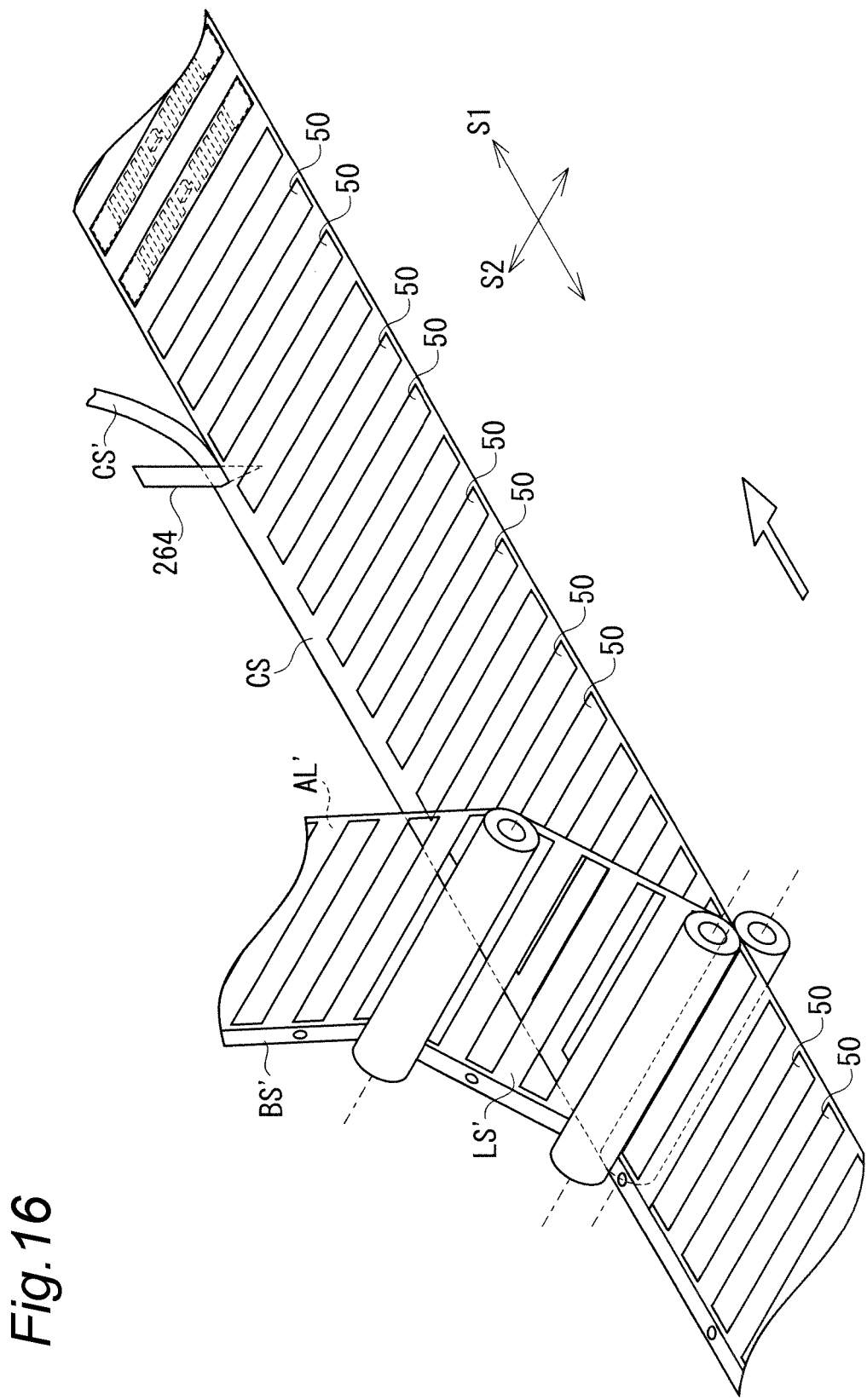
FIG. 16 is a perspective view of the base sheet subjected to finish processing.

FIG. 16 is a perspective view of the base sheet subjected to the finish processing.

As illustrated in FIG. 16, in the present embodiment, the finishing device 206 has a recovery reel 260 that peels off an excess portion BS' of the base sheet BS punched by the punching device 204 from the carrier sheet CS and winds and recovers the excess portion BS'. Specifically, the recovery reel 260 winds up and recovers an outer part LS' of the RFID tag 50 in the label seal LS, an outer portion BS' of the RFID tag 50 in the base sheet BS, and an outer portion AL' of the RFID tag 50 in the pressure-sensitive adhesion layer AL. In order to enable such peeling, the adhesive force between the base sheet BS and the pressure-sensitive adhesion layer AL is stronger than the adhesive force between the carrier sheet CS and the pressure-sensitive adhesion layer AL. For this purpose, for example, the adhesive surfaces of the base sheet BS and the carrier sheet CS are surface-treated.

The finishing device 206 also has a cutter 262 that cuts and removes an excess part CS' of the carrier sheet CS. Due to this configuration, as illustrated in FIG. 1, the carrier sheet CS to which the plurality of RFID tags 50 are peelably attached is produced. The carrier sheet CS is wound around a carrier sheet recovery reel 266 and recovered.

According to the embodiment as described above, sheet-like RFID tags can be mass-produced.

It is noted that although the present invention has been described with reference to the above-described exemplary embodiment, the embodiment of the present invention is not limited thereto.

For example, in the above-described embodiment, the RFID tag manufacturing system 200 produces the RFID tag 50 in a state of being finally attached to the carrier sheet CS as illustrated in FIG. 1. However, the embodiment of the present invention is not limited thereto. The RFID tag 50 can be produced by the punching device 204 punching the base sheet BS without attaching the carrier sheet CS to the base sheet BS.

In the case of the above-described embodiment, the punching device 204 is configured to punch the base sheet BS being conveyed. That is, the magnet roller 240 holding the flexible die 244 rotates to punch the base sheet BS being conveyed. However, the embodiment of the present invention is not limited thereto. For example, the base sheet BS can be intermittently sent, and the punching die may descend to the base sheet BS being stopped and punch the base sheet BS.

In the above-described embodiment, as illustrated in FIG. 10, the punching device 204 positions the base sheet BS based on the position of the alignment mark AM of the base sheet BS. As illustrated in FIG. 7, this alignment mark AM is used when the mounting head 110 of the mounting device 106 positions the RFIC module 14 with respect to the antenna pattern 18 (pressure-sensitive adhesion layer 42). However, the alignment mark used when the punching device 204 positions the base sheet BS may be another alignment mark or a dedicated alignment mark.

That is, in a broad sense, an RFID tag manufacturing system according to an exemplary embodiment includes a conveyance device that conveys a base sheet provided with a plurality of antenna patterns to each of which an RFIC module is fixed; a first laminating device that attaches a cover seal on the base sheet to cover the antenna patterns; and a punching device that produces a plurality of RFID tags each including one of the antenna patterns by punching the cover seal and the base sheet with a punching blade, which includes a frame-shaped cutting edge surrounding the antenna patterns, to form a frame-shaped cut, in which the cover seal is smaller in size than the base sheet, the base sheet includes an alignment mark in a non-attachment part of the cover seal, and the punching device specifies a position of the antenna pattern covered with the cover seal based on the alignment mark, and punches the cover seal and the base sheet based on the specified position of the antenna pattern.

REFERENCE NUMERALS

14 RFIC module
18 antenna pattern
50 RFID tag
200 RFID tag manufacturing system
AM alignment mark
BS base sheet
CL cut
LS cover seal (label seal)

The invention claimed is:

1. An RFID tag manufacturing system comprising:
a conveyance device configured to convey a base sheet provided with a plurality of antenna patterns that each have an RFIC module fixed thereto;
a first laminating device configured to attach a cover seal on the base sheet to cover the plurality of antenna patterns; and
a punching device configured to produce a plurality of RFID tags that each include one of the plurality of antenna patterns by punching the cover seal and the base sheet with a punching blade to form a frame-shaped cut, with the punching blade including a frame-shaped cutting edge that surrounds one of the plurality of antenna patterns,
wherein the cover seal is smaller in size than the base sheet,
wherein the base sheet includes an alignment mark, and
wherein a position of the punching device relative to each of the plurality of antenna patterns covered with the cover seal is specified based on the alignment mark, and wherein the punching device is configured to punch the cover seal and the base sheet based on the specified position.

2. The RFID tag manufacturing system according to claim 1, wherein the alignment mark of the base sheet is disposed in a non-attachment part of the cover seal.

3. The RFID tag manufacturing system according to claim 1, wherein the alignment mark is used by a mounting device to position and mount each RFIC module to an antenna pattern of the plurality of antenna patterns.

4. The RFID tag manufacturing system according to claim 1, wherein:
the base sheet and the cover seal each include a long-side direction and a short-side direction,
the conveyance device is configured to convey the base sheet in the long-side direction, and
the first laminating device is configured to attach the cover seal to the base sheet when the base sheet is conveyed by the conveyance device, such that the long-side direction of the base sheet and the long-side direction of the cover seal become parallel to each other.

5. The RFID tag manufacturing system according to claim 4, wherein the punching device includes:
a magnet roller;
an anvil roller that is disposed to oppose the magnet roller and that forms a nip region through which the base sheet passes between the magnet roller and the anvil roller; and
a flexible die that is wound around an outer periphery of the magnet roller and includes the punching blade on an outer surface thereof.

6. The RFID tag manufacturing system according to claim 5, wherein the flexible die includes a plurality of grooves on an inner surface thereof that extend in an extending direction of a rotation center line of the magnet roller and that are parallel to one another.

7. The RFID tag manufacturing system according to claim 5, wherein a through hole including an opening larger than the RFIC module is disposed at a position opposing an RFIC module on the base sheet on an outer surface of the flexible die.

8. The RFID tag manufacturing system according to claim 1, further comprising a second laminating device configured to attach a carrier sheet with a pressure-sensitive adhesion layer to an entire surface of the base sheet at an opposite side to a surface on which the plurality of antenna patterns are disposed.

9. The RFID tag manufacturing system according to claim 8, wherein the punching device is configured to punch the pressure-sensitive adhesion layer without punching the carrier sheet.

10. The RFID tag manufacturing system according to claim 9, further comprising a recovery reel that peels off, from the carrier sheet, and recovers an outer part of each of the plurality of RFID tags in the base sheet, the cover seal, and the pressure-sensitive adhesion layer after being punched by the punching device.

11. A method for manufacturing an RFID tag comprising:
conveying, by a conveyance device, a base sheet provided with a plurality of antenna patterns that each have an RFIC module fixed thereto;
attaching, by a first laminating device, a cover seal on the base sheet to cover the plurality of antenna patterns, with the cover seal being smaller in size than the base sheet;
specifying a position of a punching device relative to a position of each of the plurality of antenna patterns covered with the cover seal based on an alignment mark on the base sheet; and
producing, by the punching device, a plurality of RFID tags that each include one antenna pattern of the plurality of antenna patterns by punching, according to the specified position, the cover seal and the base sheet with a punching blade of the punching device to form a frame-shaped cut, with the punching blade including a frame-shaped cutting edge that surrounds the respective one antenna pattern.

12. The method according to claim 11, further comprising disposing the alignment mark of the base sheet in a non-attachment part of the cover seal.

13. The method according to claim 11, further comprising using the alignment mark by a mounting device to position and mount each RFIC module to a respective antenna pattern of the plurality of antenna patterns.

14. The method according to claim 11, wherein the base sheet and the cover seal each include a long-side direction and a short-side direction, and the method further comprises:
conveying, by the conveyance device, the base sheet in the long-side direction; and
attached, by the first laminating device, the cover seal to the base sheet when the base sheet is conveyed by the conveyance device, such that the long-side direction of the base sheet and the long-side direction of the cover seal become parallel to each other.

15. The method according to claim 14, further comprising:
providing a flexible die around an outer periphery of a magnet roller of the punching device, with the flexible die including the punching blade on an outer surface thereof; and
passing the base sheet through a nip region formed by an anvil roller that opposes the magnet roller.

16. The method according to claim 15, further comprising providing the flexible die with a plurality of grooves on an inner surface thereof that extend in an extending direction of a rotation center line of the magnet roller and that are parallel to one another.

17. The method according to claim 15, further comprising disposing a through hole including an opening larger than the RFIC module at a position opposing an RFIC module on the base sheet on an outer surface of the flexible die.

18. The method according to claim 11, further comprising attaching, by a second laminating device, a carrier sheet with a pressure-sensitive adhesion layer to an entire surface of the base sheet at an opposite side to a surface on which the plurality of antenna patterns are disposed.

19. The method according to claim 18, further comprising punching, by the punching device, the pressure-sensitive adhesion layer without punching the carrier sheet.

20. The method according to claim 19, further comprising peeling off, by a recovery reel and from the carrier sheet, and recovering an outer part of each of the plurality of RFID tags in the base sheet, the cover seal, and the pressure-sensitive adhesion layer after being punched by the punching device.

* * * * *